(12) United States Patent
Erdler et al.

(10) Patent No.: US 8,194,994 B2
(45) Date of Patent: Jun. 5, 2012

(54) APPARATUS AND METHOD FOR REDUCING MOTION BLUR IN A VIDEO SIGNAL

(75) Inventors: Oliver Erdler, Stuttgart (DE);
Piergiorgio Sator, Fellbach (DE);
Martin Richter, Dortmund (DE)

(73) Assignee: Sony Deutschland GmbH, Berlin (DE)

( * ) Notice: Subject to any disclaimer, the term of this patent is extended or adjusted under 35 U.S.C. 154(b) by 1222 days.

(21) Appl. No.: 11/948,367

(22) Filed: Nov. 30, 2007

(65) Prior Publication Data

US 2008/0232708 A1 Sep. 25, 2008

(30) Foreign Application Priority Data

Mar. 19, 2007 (EP) .................................. 07104412
May 31, 2007 (EP) .................................. 07109330

(51) Int. Cl.
| | |
|---|---|
| *G06K 9/00* | (2006.01) |
| *G06K 9/46* | (2006.01) |
| *G06K 9/66* | (2006.01) |
| *G06K 9/40* | (2006.01) |
| *G06K 9/20* | (2006.01) |
| *G06K 9/32* | (2006.01) |
| *H04N 5/228* | (2006.01) |
| *H04N 5/208* | (2006.01) |
| *H04N 7/01* | (2006.01) |
| *H04N 11/20* | (2006.01) |
| *H04N 5/765* | (2006.01) |
| *H04N 5/94* | (2006.01) |
| *H04N 9/88* | (2006.01) |

(52) U.S. Cl. ........ 382/255; 382/107; 382/190; 382/260; 382/282; 382/300; 348/208.1; 348/252; 348/441; 386/232; 386/263

(58) Field of Classification Search .................. 382/100, 382/103, 153, 254–255, 260–261, 263, 266, 382/274–275, 276, 293, 298–300, 107; 348/441, 348/208.1, 22.1, 252; 386/200, 232, 263, 386/270–271
See application file for complete search history.

(56) References Cited

U.S. PATENT DOCUMENTS 6,930,676 B2 8/2005 De Haan et al.
(Continued)

FOREIGN PATENT DOCUMENTS

EP 0 657 860 A2 6/1995
(Continued)

OTHER PUBLICATIONS

Chinese Office Action issued Oct. 13, 2010, in Patent Application No. 200810085481.5 (English-language translation only).
Taiichiro Kurita, "Moving Picture Quality Improvement for Hold-type AM-LCDs", SID 01 Digest, Science and Technical Research Laboratories, NHK (Japan Braoadcasting Corporation), pp. 986-989.

(Continued)

*Primary Examiner* — Anand Bhatnagar
*Assistant Examiner* — Nathan Bloom
(74) *Attorney, Agent, or Firm* — Oblon, Spivak, McClelland, Maier & Neustadt, L.L.P.

(57) ABSTRACT

The present invention relates to a method and an apparatus for reducing motion blur in a video signal. The apparatus comprises motion estimation means (1) for providing motion information of a video signal, high pass filter means (3a, 3b) for high pass filtering said video signal, and first modulating means (4a, 4b) for modulating the high pass filtered video signal from said high pass filter means (3a, 3b) with motion information from said motion estimation means (1) and for outputting a motion dependent high pass filtered video signal.

15 Claims, 1 Drawing Sheet

U.S. PATENT DOCUMENTS

2004/0238718 A1* 12/2004 Washisu .................. 250/201.2
2005/0030302 A1* 2/2005 Nishi et al. .................. 345/204
2005/0190164 A1 9/2005 Velthoven et al.

FOREIGN PATENT DOCUMENTS

EP 0 657 860 B1 11/2004
JP 2002-351382 12/2002

OTHER PUBLICATIONS

Michiel A. Klompenhouwer, et al., LCD Motion Blur Reduction with Motion Compensated Inverse Filtering, SID 04 Digest, pp. 1340-1343.

Baek-woon Lee, et al., "Spatio-Temporal Edge Enhancement for Reducing Motion Blur", SID 06 Digest, pp. 1801-1803.

* cited by examiner

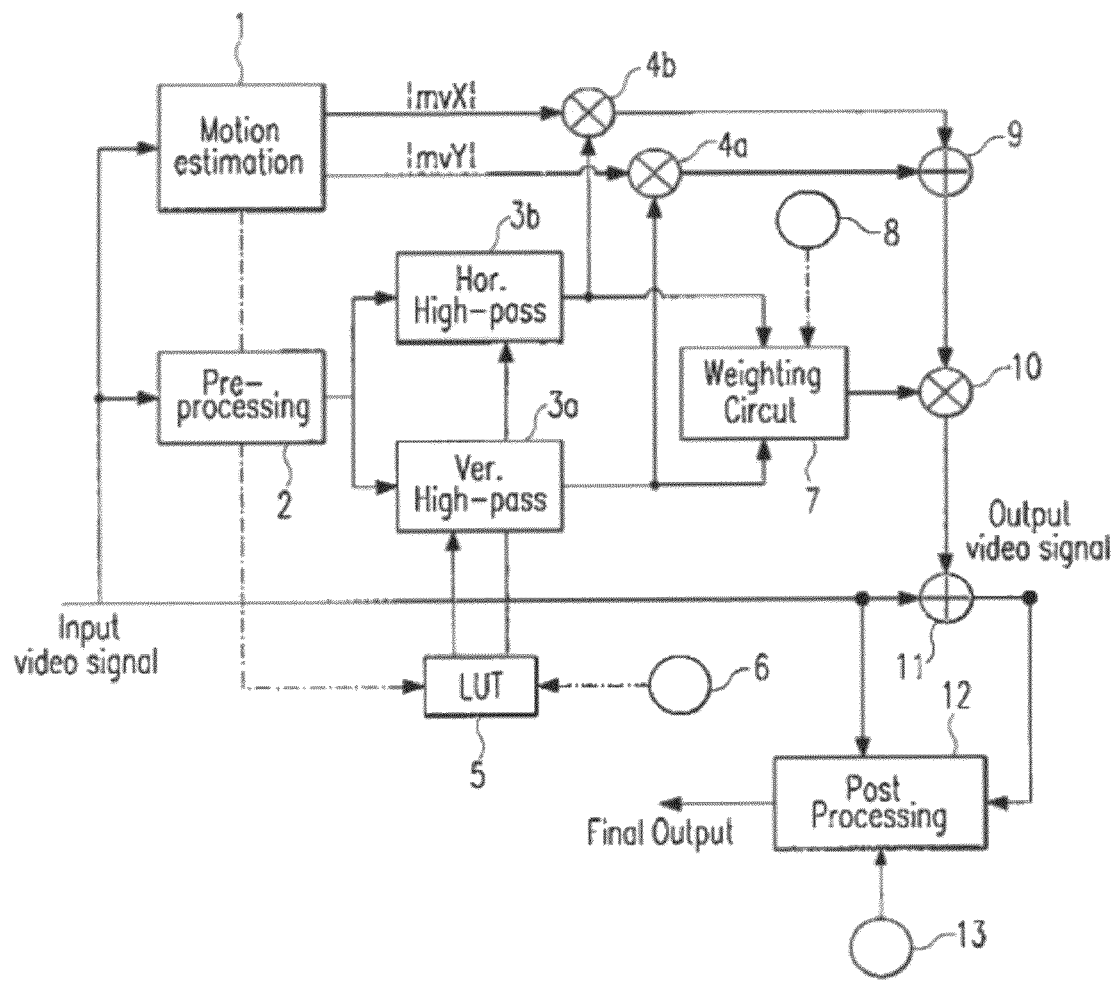

APPARATUS AND METHOD FOR REDUCING MOTION BLUR IN A VIDEO SIGNAL

The present invention relates to an apparatus and a method for reducing motion blur in a video signal. Modern displays, e.g. modern hold type displays, such as liquid crystal displays and other displays, due to the persistence of the image for the complete frame time, suffer from an artefact called "motion blur". Whenever the display renders the sequence of pictures, representing some motion, the observer perceives the moving objects, especially around the edges, blurred or unfocused.

The present invention now has as an object to present an apparatus and a method for reducing motion blur in a video signal, enabling the improvement of the overall video quality with the low processing complexity.

The above object is achieved by an apparatus for reducing motion blur in a video signal according to claim 1.

The object is further achieved by a method for reducing motion blur in a video signal according to claim 9.

Advantageous features are defined in the respective dependent claims.

Generally, the method and the apparatus of the present invention enable a reduction of the motion blur effect using motion vector information, eventually edge information and high pass filtering, which can be adaptive high pass filtering. Further, the method and the apparatus of the present invention may include pre- and post-processing which are applied in order to reduce noise or unwanted artefacts of the input video signal and to produce a consistent output, respectively.

Advantages of the present invention are the improvement of the overall quality, such as the sharpness in the motion case, while keeping artefacts as reduced as possible. Further, another advantage is the relative low complexity of the processing. Also, the present invention has the advantage of only processing the video signal, i.e., the sequence of pictures which are later sent to the display, but it does not require any particular modification of the display device itself.

The present invention is further explained in more detail in the following description of the preferred embodiment in relation to the enclosed FIG. 1, which shows a block diagram of an apparatus for reducing motion blur in a video signal according to the present invention.

Generally, it is to be noted that the present invention can be implemented with hardware components, software components or any wanted or suitable mixture of hardware and software components. In the following description and claims, the term 'means' is intended to encompass any kind of structure which is adapted to perform specified functions. Also, it should be noted that the invention may comprise additional elements in addition to the described ones if necessary or advantageous in a practical implementation.

The apparatus or system of the present invention, an embodiment of which is shown in FIG. 1, comprises, for the input part, of a motion estimation means 1, which provides the needed motion information, e.g. in form of motion vectors describing the motion trajectory from image frame to image frame of each pixel or of respective groups of pixels in the horizontal direction (mvX) and the vertical direction (mvY) of the image formed by the input video signal, and a pre-processing block 2 adapted to reduce input noise in the input video signal.

Hereby, pre-processing block 2 may comprise a noise/artefact reduction system, as for example a low pass filter. This will take care of attenuate unwanted content, mainly noise, but also e.g. MPEG artefacts. One possible embodiment of the block 2 is a 5 taps, e.g. cross-shaped, median filter, whereby the processed pixel is in the centre. The filter 2 could operate in the motion direction, i.e., it is rotated in that direction e.g. by sub-pixel interpolation. Another option is to realize the block 2 as two 3 taps median filters which are crossed at the processed pixel and then weight these accordingly to the horizontal and vertical motion components. Further alternative implementations of the pre-processing block 2 are possible.

After these, two separate motion dependent spatial high pass filters 3a, 3b produce high frequency content in the horizontal 3b and vertical 3a direction. The high pass filter 3a, 3b can e.g. be implemented as FIR (finite impulse response) filters, the coefficients and/or effective length of which depends on the motion speeds. However, different implementations are possible. A Look Up Table (LUT) 5 provides the adaptive filters 3a, 3b with the proper coefficients/setup, depending on the motion information and, eventually, on an external input 6. Specifically, the external input 6 of the LUT 5 can be a one time setup (panel dependent) or run-time control or both. The local picture content (texture/edge/flat or noise level, etc.) can control the run-time part of the external LUT input 6, in order to provide fine tuning for the two high pass filters 3a, 3b, thus allowing a better discrimination performance of the high pass filters. Also the input video type, for example interlaced or progressive, can control the LUT 5. Specifically in case of interlaced content, the filter taps could have, in the vertical direction, a different spacing (usually the filter skips the pixels belonging to the other field.) The LUT 5 can be realised by a memory providing data as a function of an input address. It may, however, be possible to implement a numerical function instead of the LUT 5, e.g. by providing the high pass filters 3a, 3b with coefficients which are direct values of the motion speeds, e.g. by implementing an appropriate transformation.

A weighting circuit 7, using the high pass filters 3a, 3b information, produces a weighting factor, which is then used in a modulation means 10 to modulate the motion dependent high pass picture. The concept is that, when in flat areas, the high pass filters 3a, 3b produce no output, while along edges or textures, they produce content, thus implementing implicit edge/texture/flat discrimination. As stated, the high pass filters 3a, 3b could be simple linear FIR filters or more sophisticated non-linear sharpness enhancement ones. This circuit 7 e.g. provides a linear combination of the high pass filter outputs, but may have an external control 8, or gain, which can tune the weighting, usually depending on the picture content (again, noise or other).

The absolute (or square) values, of the motion vectors, in horizontal (mvX) and vertical (mvY) direction, modulate the outputs of the high pass filters 3a, 3b in a respective modulation means 4a and 4b. The idea here is that whenever no motion occurs, there is also no blur and no need of high frequency content (and thus no artefacts occur). On the other hand, the faster the motion, the more high frequencies, i.e. de-blurring, is required. Of course, the vector values can be filtered, for example, vectors below a certain threshold could be considered as no motion, i.e. zero. The horizontal and vertical motion dependent high pass pictures from the modulation means 4b and 4a are combined in a combining means 9 and then modulated by the weighting factor in the modulation means 10. The modulation means 4a, 4b, 10 may for example be implemented as multipliers.

As mentioned before, the weighting circuit 7 controls the amount of the combined (vertical and horizontal) high frequency content.

At this point, the input picture is combined in a combining means 11 with the processed one output from the combining means 9 and a post-processing block 12 filters, using the original input video signal and the processed signal output from the combining means 11, this content in order to produce the final output video signal.

The post-filter block 12 can have several implementations, for example it could be a low pass filter, a coring circuit, a clip detector and compensator, or a measuring means for measuring the consistency of the processing or any other suitable filter.

Since this filter 12 has access to the original picture and the processed one, it can e.g. detect the amount of processing or the "density" of processing (i.e. how many pixels in a certain area are modified above a certain threshold) and perform a proper mixing between the original and improved picture. Another option is to combine the post-processing with edge detection and to make the processing in these areas as "uniform" as possible. This will avoid "holes" in the edges, which, in case of motion, are usually negatively perceived by an observer. This means that pixels which are processed (or unprocessed) surrounded by unprocessed (or processed, respectively), will be reverted to unprocessed (or processed, in the latter case). For example, filter 12 could be a smoothing filter which smoothes or removes 'spikes' in the image occurring due to noise. For example, filter 12 could function to evaluate a certain number of pixels at a time (e.g. 5×5) and, if some pixels are substantially different from the original one, replace them with the original values.

The post-processing block 12 takes also care of mixing the original content with the processed one, depending on possible external information, like noise or other picture information. As mentioned above, edges are a critical content, but also flat areas or textures can have different mixing processing. Specifically, flat areas, if properly detected, while there is still the possibility of having motion vector, have to stay unprocessed, in order to avoid noise enhancement.

The apparatus and the method of the present invention provide a reduction of the motion blur in a video signal or a picture sequence. Hereby, it is not necessary to change the display device since the suggested processing only deals with the video signals. A further advantage of the present invention is the relative low complexity of the method and the apparatus. An advantage of the implementation of the adaptive high pass filters using the Look Up Table is the flexibility of the approach which makes the system and the method tuneable to different types of displays and/or contents.

The invention claimed is:

1. Apparatus for reducing motion blur in a video signal, comprising:
    motion estimation means for providing motion information of a video signal;
    high pass filter means for high pass filtering said video signal and for outputting horizontal high pass filtered video signal and a separate vertical high pass filtered video signal;
    first modulating means for modulating the horizontal and vertical high pass filtered video signal signals from said high pass filter means with motion information from said motion estimation means and for outputting a motion dependent high pass filtered video signal;
    weighting means for obtaining a weighting factor which is a weighted combination of the horizontal and vertical high pass filtered video signals from said high pass filter means; and
    second modulating means for modulating said motion dependent high pass filtered video signal with said weighting factor.

2. Apparatus according to claim 1, wherein said weighting means is adapted to tune the weighting factor depending on external information.

3. Apparatus according to claim 1, wherein said high pass filter means comprises a horizontal high pass filter for high pass filtering said video signal in the horizontal direction and a vertical high pass filter for high pass filtering said video signal in the vertical direction.

4. Apparatus according to claim 1, wherein said high pass filter means is adapted to filter said video signal depending on motion information from said motion estimation means and/or external information using a look up table.

5. Apparatus according to claim 1, comprising:
    pre-processing means for reducing artefacts and/or noise in said video signal before the video signal is supplied to said high pass filter means.

6. Apparatus according to claim 1, comprising:
    post-processing means for combining the video signal with said motion dependent high pass filtered video signal.

7. Apparatus according to claim 6, wherein said post-processing means is adapted to combine the video signal with said motion dependent high pass filtered video signal depending on external information.

8. Method for reducing motion blur in a video signal, comprising the steps of:
    estimating motion in a video signal for providing motion information;
    high pass filtering said video signal and outputting horizontal high pass filtered video signal and a separate vertical high pass filtered video signal;
    modulating the horizontal and vertical high pass filtered video signals with said motion information;
    outputting a motion dependent high pass filtered video signal;
    obtaining a weighting factor which is a weighted combination of the horizontal and vertical high pass filtered video signals; and
    modulating said motion dependent high pass filtered video signal with said weighting factor.

9. Method according to claim 8, wherein the weighting factor is tuned depending on external information.

10. Method according to claim 8, wherein said high pass filtering step comprises a horizontal high pass filtering step for high pass filtering said video signal in the horizontal direction and a vertical high pass filtering step for high pass filtering said video signal in the vertical direction.

11. Method according to claim 8, wherein said video signal is high pass filtered depending on motion information from said motion estimation means and/or external information using a look up table.

12. Method according to claim 8, further comprising the step of:
    pre-processing said video signal for reducing artefacts and/or noise in said video signal before the high pass filtering step.

13. Method according to claim 8, further comprising the step of:
    combining the video signal with said motion dependent high pass filtered video signal.

14. Method according to claim 13, wherein said video signal is combined with said motion dependent high pass filtered video signal depending on external information.

15. Apparatus for reducing motion blur in a video signal, comprising:

a motion estimator that provides motion information of a video signal;

high pass filter that high pass filters said video signal and outputs a horizontal high pass filtered video signal and a separate vertical high pass filtered video signal;

a first modulator that modulates the horizontal and vertical high pass filtered video signals from said high pass filter with motion information from said motion estimator and that outputs a motion dependent high pass filtered video signal;

a weighting circuit that obtains a weighting factor which is a weighted combination of the horizontal and vertical high pass filtered video signals from said high pass filter; and second modulator that modulates said motion dependent high pass filtered video signal with said weighting factor.

\* \* \* \* \*